Sept. 11, 1962    J. F. SCAVINI    3,053,104
DEVICE FOR PRODUCING REGULATED RECTILINEAR MOVEMENTS
Filed July 29, 1960    9 Sheets-Sheet 1

Sept. 11, 1962  J. F. SCAVINI  3,053,104
DEVICE FOR PRODUCING REGULATED RECTILINEAR MOVEMENTS
Filed July 29, 1960  9 Sheets-Sheet 2

Sept. 11, 1962 J. F. SCAVINI 3,053,104
DEVICE FOR PRODUCING REGULATED RECTILINEAR MOVEMENTS
Filed July 29, 1960 9 Sheets-Sheet 3

Sept. 11, 1962 J. F. SCAVINI 3,053,104
DEVICE FOR PRODUCING REGULATED RECTILINEAR MOVEMENTS
Filed July 29, 1960 9 Sheets-Sheet 7

United States Patent Office 3,053,104
Patented Sept. 11, 1962

3,053,104
DEVICE FOR PRODUCING REGULATED
RECTILINEAR MOVEMENTS
Jean Francois Scavini, Asnieres, France, assignor to Societe des Forges et Ateliers du Creusot, Paris, France
Filed July 29, 1960, Ser. No. 46,234
Claims priority, application France Aug. 6, 1959
6 Claims. (Cl. 74—424.8)

Slow rectilinear movements are usually produced by means of screw-and-nut systems; when the member performing a rectilinear translational movement, either a screw or a nut, is hidden by other members, its position may be indexed by determining the rotation imparted to the other member of the screw-and-nut system.

This system enables translational movement of the member to be regulated with complete reliability, since it keeps one of the two members continuously locked with respect to the other.

In some cases, the locked member must be able to carry out a rapid movement independently of its slow movement, and this is done by making a nut in a number of parts, so that when the latter are assembled and rotationally driven the screw carries out its normal slow translational movement, and when they are moved away from one another, the screw, thus freed from the nut, can carry out a rapid movement by virtue of a suitable driving action.

The chief disadvantage of this arrangement resides in that, after the said rapid movement, the screw, which is no longer in engagement with the nut, is no longer connected to the driving components which move it slowly, and it is always a difficult matter to re-engage the screw with the nut; another disadvantage of this arrangement resides in the complicated construction of the nut.

The present invention relates to a device for producing regulated rectilinear movements, of the type using a screw-and-nut system.

The said device comprises an intermediate member associated with a rotary driving member and with a driven member which is constrained to move in a direction parallel to the axis of rotation of the driving member, the said intermediate member being capable of moving with respect to the driving member parallel to the foregoing direction, and also being capable of being locked in the said relative movement, the said intermediate member being rotationally fast with the driving member, and furthermore being associated with the driven member so as to form a screw-and-nut system therewith.

The device according to the invention enables a solution to be found to the problems which arise when two movements, either a slow or a fast movement, have to be imparted to the receiving member.

An advantageous feature of the invention resides in that, when the intermediate member and the driven member have moved together translationally after the intermediate member has been disengaged from the driving member, re-engagement can be effected simply by rotating the driving member; for this purpose, the intermediate member must remain permanently fast (in the engaged or disengaged position) in rotational fashion with the driving member. Suitably directed rotation of the driving member may then be transmitted to the intermediate member, and the screw-and-nut system will then enable the driven member or the intermediate member to carry out a slow translational movement. According to whether or not abutments limit translational movements of one of the said two members, the other one of the said members will carry out a translational movement, and arrangements will be made to limit displacement of the driven member so that the intermediate member derives a helical displacement from the foregoing rotation and re-engages with the driving member.

The device according to the invention is especially suitable for adjusting the position of a control rod used for regulating the operation of nuclear reactors; the said rods, which are made of a neutron-absorbing material, are carried by the receiving member of the device, and may thus be driven to a greater or lesser degree into the heart of the reactor by virtue of the slow movement of the said member; the rapid movement enables the rods to be rapidly driven or darted into the heart of the reactor so as to stop the reactor from operating should the need arise (the rods then acting as safety rods).

Other advantages and features of the invention will moreover become apparent from the following description, with reference to the appended drawings, of two examples of use of the device for producing regulated rectilinear movements to which the invention relates; these examples are concerned with devices for handling vertical control rods for nuclear reactors of the type using water under pressure of the "boiling-water" type.

FIGURES 1, 2, and 3 are diagrammatic longitudinal sections through a form of embodiment of the invention, corresponding to three different conditions of the device.

Figure 1:
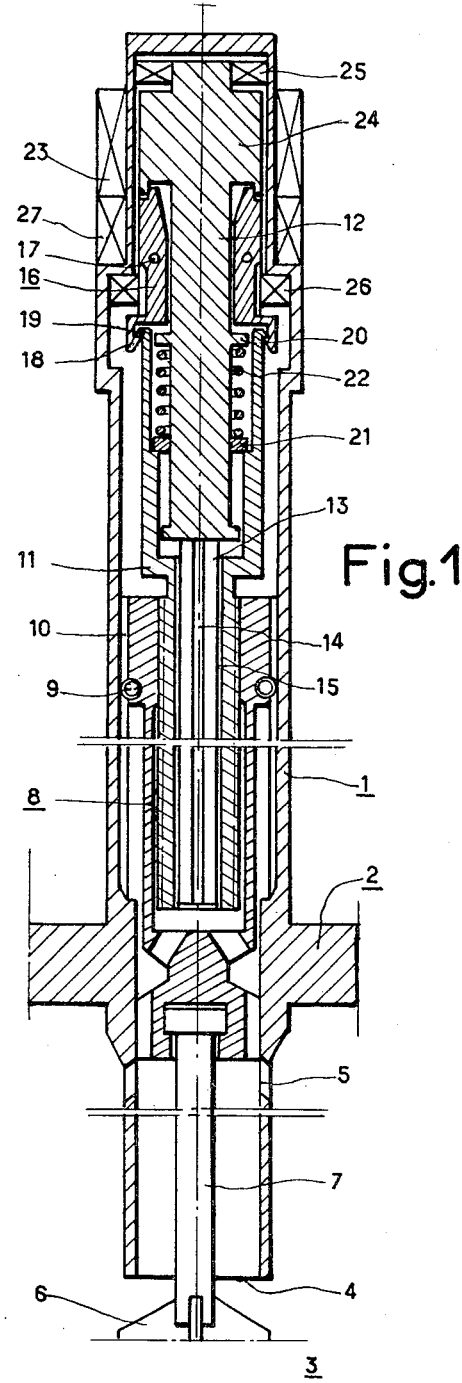

FIGURE 1 shows the enclosure 1 containing the device and the upper part of the metal envelope 2 inside which the heart 3 of the reactor is disposed; the associated reactor in this case is of the "pressurised water" type, and the liquid has free access to the inside of the enclosure 1 through the bottom 4 thereof; orifices 5 enable the water pressures on either side of the walls of the said enclosure to be equalised when the control rod 6 is moved; the said rod and the stem 7 which carries it constitute the lower part of the driven member 8. This member 8 forms a nut; it is equipped with running rollers 9 which are constrained to move in longitudinal grooves 10 in the walls of the enclosure 1. The intermediate member 11 is threaded at the bottom, and constitutes the second element of the screw-and-nut system. 12 represents the driving member; the latter is extended at the bottom by a splined stem 13 comprising teeth 14 to which the grooves 15 in the member 11 fit, and this enables the intermediate member 11 to be made rotationally fast with the driving member 12. The arms 16 can pivot about pins 17 fitted to the driving member 12; these arms comprise lugs 18 which are capable of becoming coupled to the lugs 19 situated at the top end of the intermediate member 11. A shoulder 20 on the driving member and a collar 21 form abutments for the spring 22. The driving member 12 is rotated by means of a motor whereof the stator 23 is outside the fluid-tight enclosure 1; the rotor is carried by the peripheral part 24 of the driving member 12. Bearings 25 and 26 enable the said member to be suspended; an electromagnet 27 enables the arms 16 to be pivoted. In the position illustrated in FIGURE 1, the intermediate member 11 is engaged with the arm 16, and the spring 22 is compressed, the collar 21 then bearing against a shoulder on the intermediate member 11. When the member 11 is engaged with the driving member 12, and power is supplied to the electromagnet 27, operation is as follows: the member 11 is engaged with the member 12; the driving member 12, together with the member 11 which is then fast with it, is rotationally driven by means of the field stator 23; the screw-and-nut system enables the rod 6 to move progressively downwards into the heart of the reactor; reversing the direction of rotation raises the said rod. The position illustrated in FIGURE 1 corresponds to the top position of the said rod.

Figure 2:
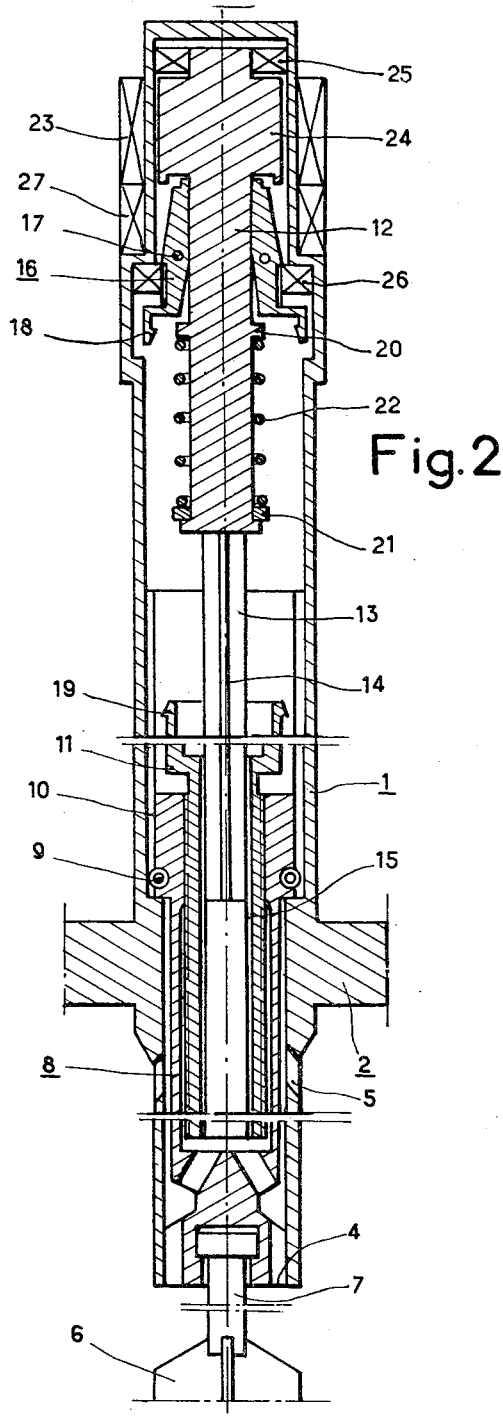
Figure 7:
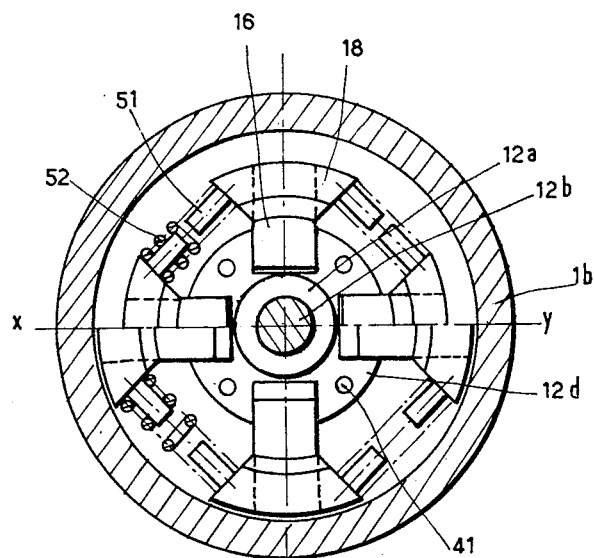
FIGURE 7 is a transverse section on a larger scale, in the plane AA in FIGURE 5.
Figure 8:
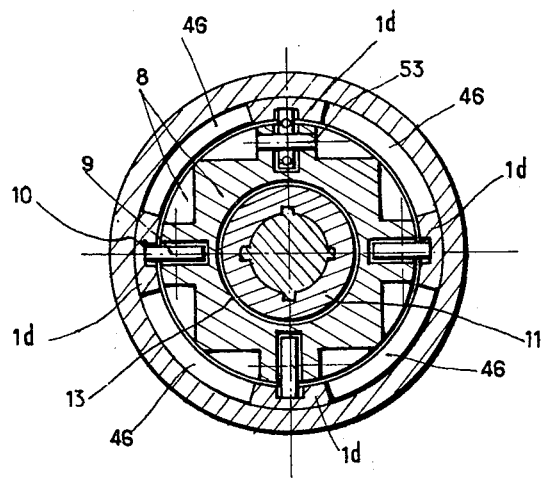
FIGURE 8 is a transverse section on a larger scale, in the plane BB in FIGURE 6.

In the position illustrated in FIGURE 2, the intermediate member 11 and the driven member 8 are in their bottom position, which corresponds to the control rods 6 being driven to the maximum extent into the heart of the reactor. This position has been obtained by cutting off the power supply to the electromagnet 27, and this has first of all caused the arms 16 to be pivoted under the action of return springs which are illustrated in FIGURE 7 and described in connection with FIGURE 5, and has then caused the spring 22 to expand and the intermediate member 11 to be projected or darted downwards together with the receiving member 8. This action is rapid, so that the reactor can be stopped almost instantaneously; however, a retarding system is provided at the end of the stroke in order to prevent the foregoing members from undergoing any impact with the parts which limit their movement together; this system will be described in connection with FIGURE 5, and is illustrated in FIGURES 6 and 8.

Figure 3:
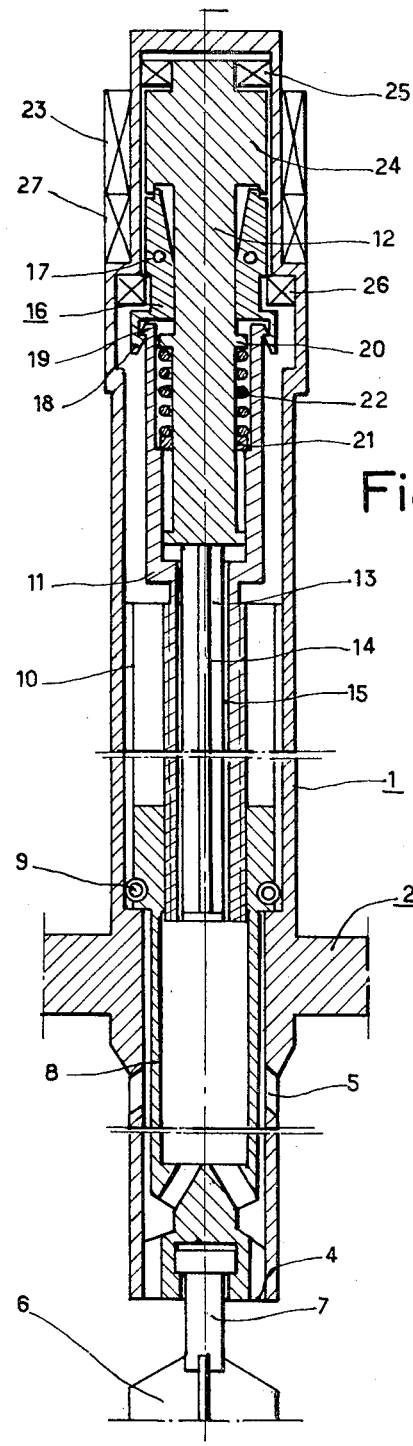

FIGURE 3 shows the condition of the device when the intermediate member has just engaged with the lugs 18 on the arms 16, the control rod 6 and the driven member 8 still being in the bottom position. The member 11 is engaged from the position illustrated in FIGURE 2 in the following manner: rotation of the driving member 12, helical displacement of the member 11 inside the driven member 8 which is then fixed, compression of the spring 22, bringing the lugs 19 on the member 11 into position above the lugs 18 on the arms 16, and engagement by pivoting the arms 16 under the action of the electromagnet 27 to which power is again supplied.

Figure 4:
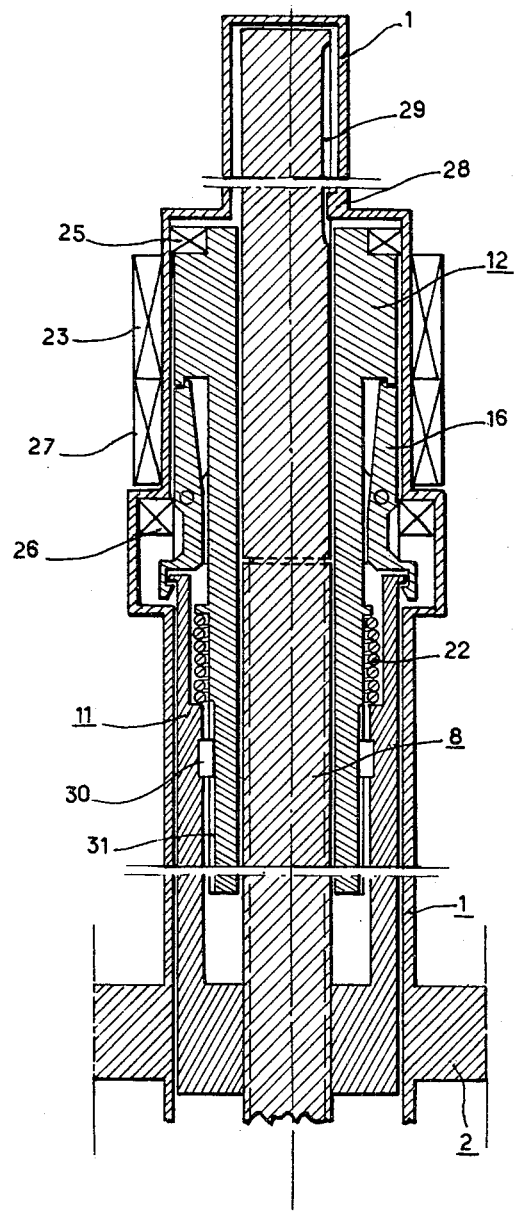
FIGURE 4 is a diagrammatic longitudinal section through a second form of embodiment of the invention, corresponding to the position in which the "control rod is removed from the reactor."

Referring now to FIGURE 4, it will be seen that the relative arrangement of the three main members 8, 11, 12 is different; these members nevertheless have the same functions. The control rod 6 is carried by the driven member 8 which occupies the centre of the device. A key 28 as fast with the frame 1 engages in a groove 29 in the driven member 8, thus preventing the latter from rotating but allowing it translational movement. The driving member 12 is annular, and surrounds the upper part of the member 8; the pivoting arms 16 are also fitted to the driving member 12. The intermediate member 11 is illustrated in the engaged position; this member is equipped with keys 30 which engage in the grooves 31 in the driving member 12 so as to make the members 11 and 12 rotationally fast. The screw-and-nut system is also formed by the intermediate member 11 in conjunction with the driven member 8. This latter member is illustrated in its top position in FIGURE 4; in order that it may be correctly guided by the key 28 even in the bottom position, it must, when in the top position, be much higher than the upper part of the driving member 12, and this leads to elongation of the upper part of the enclosure 1 as compared to the device in FIGURES 1 to 3.

Figure 5:
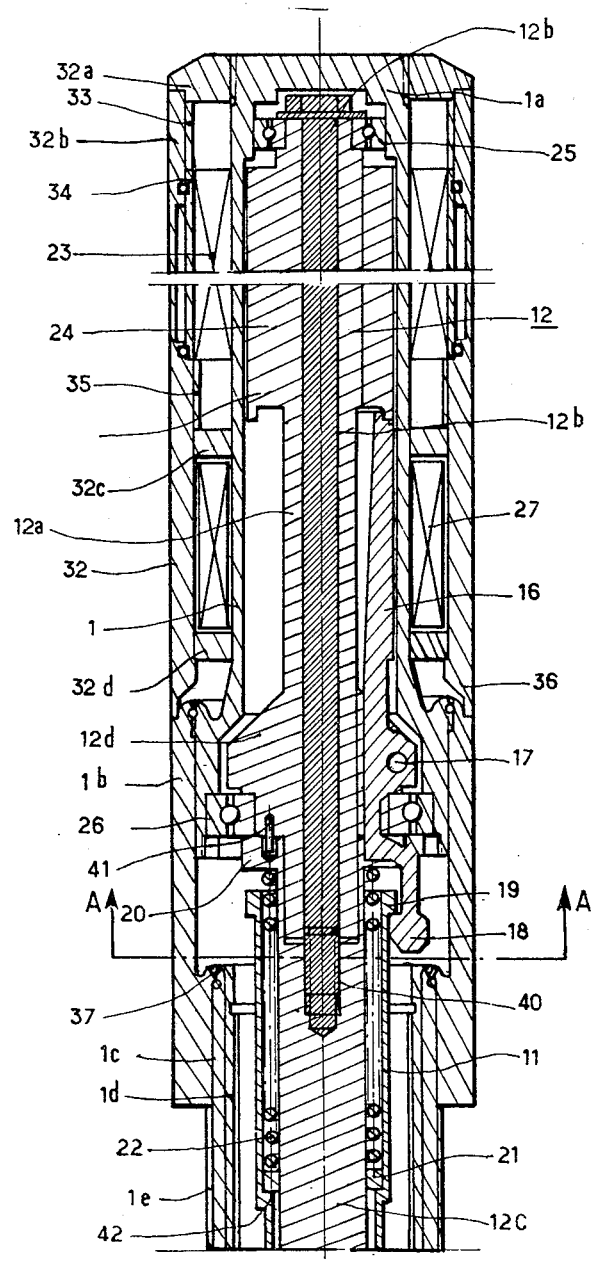
FIGURE 5 is a longitudinal section showing in detail the upper part of the device illustrated in FIGURES 1 to 3.
Figure 6:
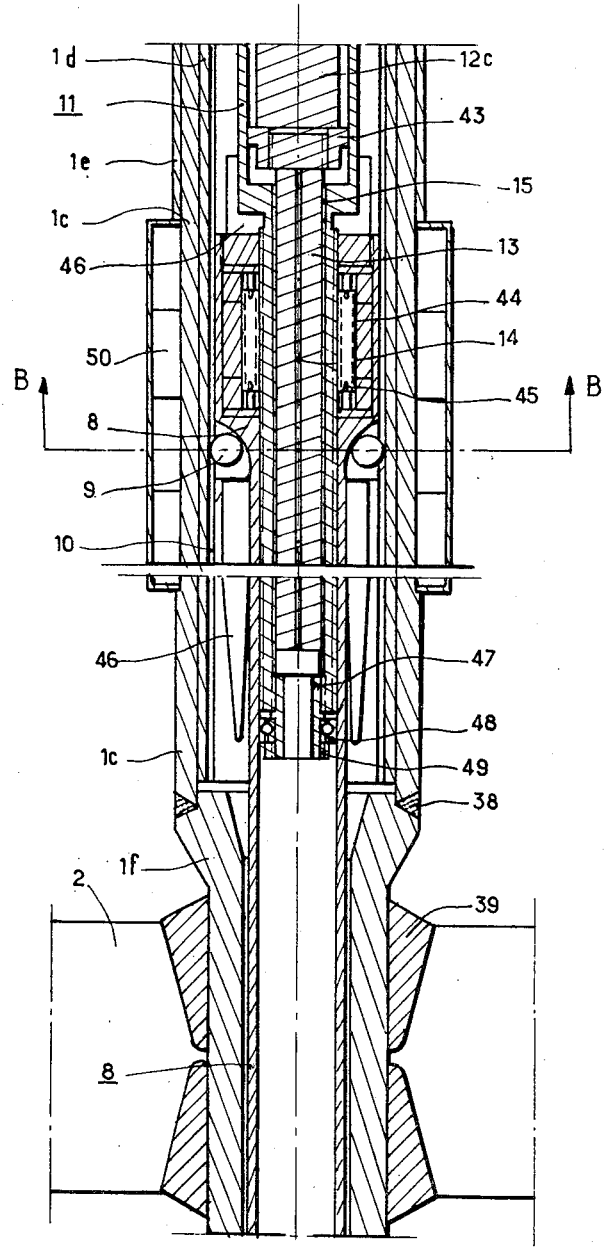
FIGURE 6 is a longitudinal section showing the lower part of the said device in detail.

FIGURES 5 and 6 show a detailed section corresponding to the diagram in FIGURES 1, 2 and 3 showing the principle, and the same elements are to be found. The electrical control components, field stator 23 and electromagnet 27, are outside the enclosure 1, but they are further protected by an additional cylindrical enclosure 32 linked to the enclosure 1; the enclosure 1 itself is made up of a plurality of elements 1a, 1b, 1c, 1d, 1e, 1f. The enclosure 32 is made up of the elements 32a, 32b, 32c, 32d, and the spacers 33, 34, 35; the cap 32a is screwed on to the element 1a. All the parts making up the enclosure 1 are assembled in fluid-tight fashion in order to prevent any leak of radioactive fluid in the said enclosure from gaining access to the outside; this fluid-tight seal is provided by welding the members 1a and 1b at 36 after they have been screwed together, by welding the members 1b and 1c at 37 after they have likewise been screwed together, by welding the members 1c and 1f at 38, and by welding the enclosure 1 as a whole to the metal envelope 2 of the reactor at 39. The body 12a of the driving member 12 is made fast with the middle portion 12c by the pin 12b which is screwed to 12c at 40; centering pieces 41 fitted into the shoulder 20 on the middle member 12c make fast the member 12c and the enlarged portion 12d of 12a carries the arms 16. The position of the arms 16 illustrated in FIGURE 5 corresponds to engagement of the intermediate member 11 with the driving member 12, the electromagnet 27 then having power supplied to it; disengagement occurs under the action of return springs when power is no longer supplied to the electromagnet 27. In the engaged position, the collar 21 is held against a shoulder 42 on the intermediate member 11 by the thrust of the spring 22; the driving member 12 and its stem 13 together form a single unit which is centered by means of the nut 43, the latter serving as a stroke-terminating abutment for the spring 22. In order to reduce the work done by frictional forces between the intermediate member 11 and the driven member 8, the latter has a complex structure of known type in which threaded pins 44 are distributed all round the intermediate member 11, inside an annular cavity in the receiving member 8. These pins 44 can be rotated with respect to the said member by virtue of pivots 45 which also form abutments, thus enabling the said pins, and consequently the driven member 8, to be longitudinally displaced by rotation of the intermediate member 11, since the thread on the intermediate member 11 is in constant engagement with the threads on the pins 44. A hydrodynamic braking system is provided for rapid movement of the rod; it takes the form of the upper part of the driven member 8 which forms a piston inside the member 1d which represents the associated cylinder. There are grooves 46, of downwardly decreasing width, in the internal face of the member 1d; when the intermediate member 11 becomes disengaged from the driven member 8, these members are together rapidly projected by the spring 22, and then braked at the end of the stroke by throttling of the liquid in the grooves 46, so that there is no fear of any impact which would be detrimental to the control rod or any other member of the device.

A sleeve 47 screwed into the intermediate member 11 extends the latter, and facilitates guiding it inside the driven member 8 by a ball-race 48 which is locked to the sleeve 47 by means of the nut 49.

An electromagnetic device consisting of inductance coils 50 surrounding the enclosure 1d enables the position of the driven member 8 to be indexed by measurement of the currents flowing in the said coils.

In the transverse section shown in FIGURE 7, the intermediate member 11, the spring 22 and the middle portion 12c of the driving member have been omitted to facilitate understanding. The four pivoting arms 16 are shown, and comprise heads or lugs 18 in which pins 51, serving to guide return springs 52, are laterally fixed; above the line XY, the arms are assumed to be in the engaged position with respect to the intermediate member 11, and in the disengaged position below the said line. In the engaged position, power is supplied to the electromagnet 27, and the return springs 52 are compressed; when power is no longer supplied to the electromagnet 27, the return springs 52 expand and push against the lateral faces of the heads 18, bringing the latter nearer to the enclosure 1, and thus producing the desired disengagement.

FIGURE 8 shows how the means for guiding the driven member 8 and the system for braking it are made. The rollers 9 fitted on pins 53 take the form of ball-races running in grooves 10 in the hollowed-out jacket 1d; the hollows in the said member constitute the grooves 46 previously mentioned. Orifices are provided in the various translationally moving members in order to prevent any hydraulic lock.

Furthermore, the rod may be rapidly driven or darted inwards at will (acting as a safety rod) whatever its position in the reactor at the instant when the spring which propels it is unlocked; the said spring is in fact always under load when the rod is moving slowly (pilot-running of the reactor).

Figure 9:
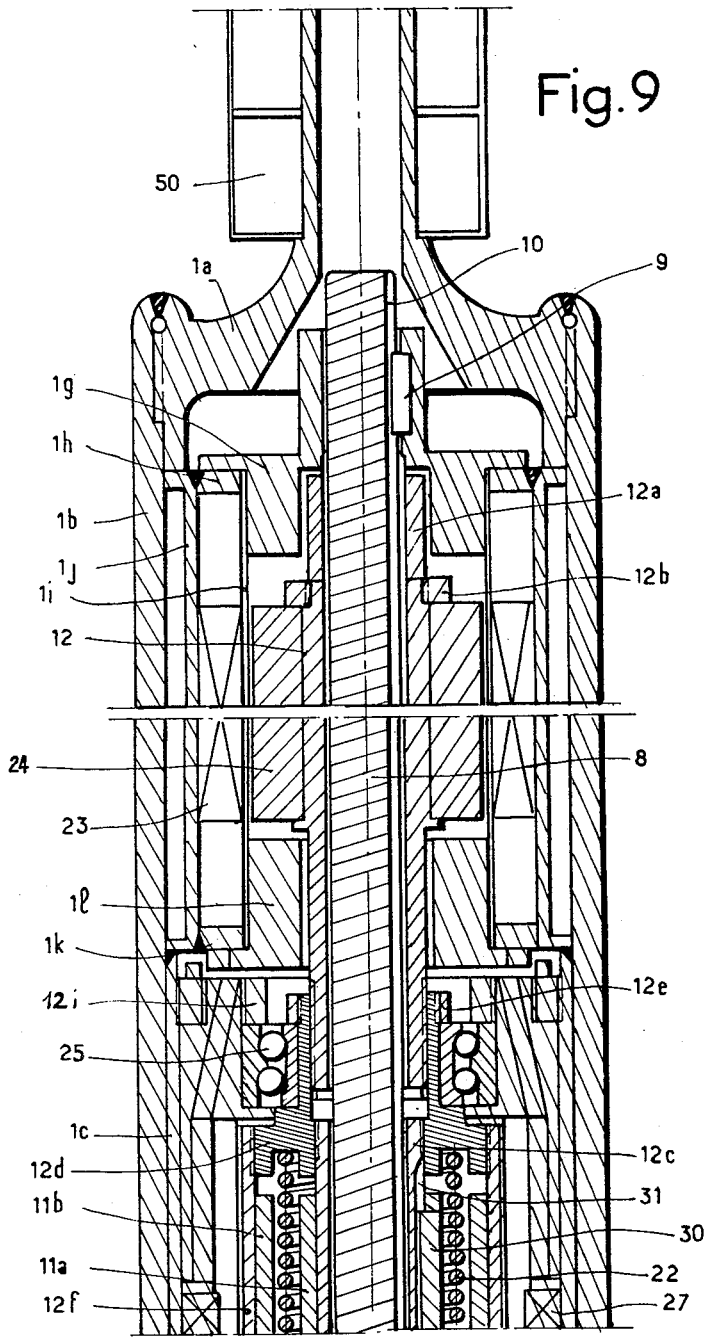
FIGURE 9 is a detailed longitudinal section through the upper part of the device diagramamtically shown in FIGURE 4.
Figure 10:
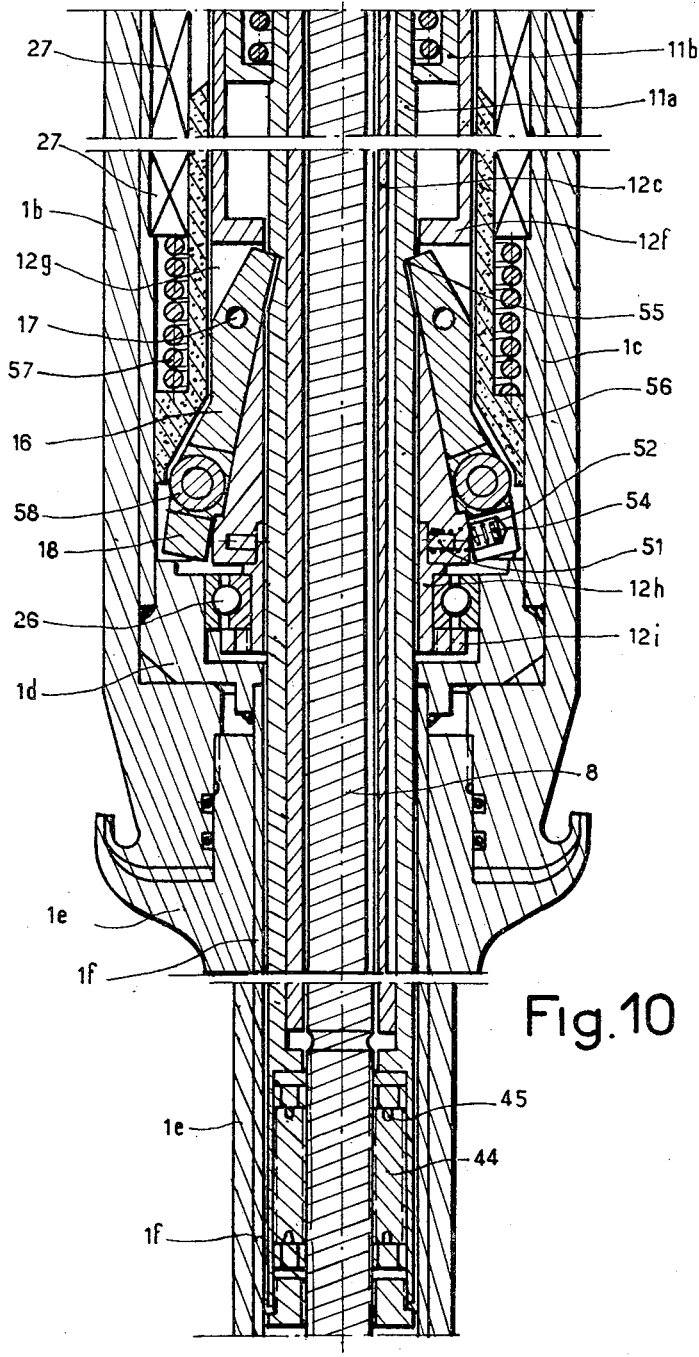
FIGURE 10 is a detailed longitudinal section through the lower part of the said device.

In the example of embodiment illustrated in FIGURES 9 and 10, corresponding to the diagrammatic FIGURE 4, the stator 23 which rotates the driving member 12 is in a fluid-tight box situated inside the enclosure 1, the latter being made up of the elements 1a, 1b, 1c, 1d, 1e, 1f, 1g, 1h, 1i, 1j, 1k, 1l, which are fitted together in such a manner as to give an external fluid-tight seal. The driving member 12 is made up of a plurality of elements 12a, 12b, 12c, 12d, 12e, 12f, 12g, 12h, 12i, and the rotor 24 carried by the element 12a. The elements 12b, 12e, 12i are locknuts; the element 12d serves to fit together the elements 12a, 12c, 12f; the element 12f is extended by the element 12g which carries the pivoting arms 16; the element 12h is fast with the element 12g and with the internal rim of the ball-race 26 by way of the locknut 12i; and the element 12h comprises studs 51 serving as guides for one end of the return springs 52 for the arms 16. The other end of these springs is guided inside recesses 54 carried by the head 18 of the said arms; the internal rim of the ball-race 25 is held between the element 12d and the locknut 12e. The key 30, which is fast with the intermediate member 11, is constrained to follow the groove 31 in the element 12c, and this enables the intermediate member 11 to be made rotationally fast with the driving member 12, but translationally free.

The intermediate member 11 is really made up of two elements 11a and 11b; when the member 11a becomes disengaged at 55, the spring 22 expands and projects the members 11a and 11b together downwards; displacement of the member 11b, which forms an abutment for the spring 22, is limited by the element 12f, while the member 11a can move freely to a lower level.

The arms 16 are pivoted in the following manner; when power is supplied to the electromagnet 27, the member 56 is returned towards the top of the device, and compresses the spring 57; the member 56 then has no effect on the arms 16, which are in the engaged position under the action of the return springs 52. When power is no longer supplied to the said electromagnet 27, the spring 57 expands and the member 56 acts on the running roller 58 of the arm 16, thus causing the latter to pivot about its pin 17 and disengaging the intermediate member 11a.

The metal envelope 2, which cannot be seen in FIGURE 10, is situated at the level at which the elements 1f and 1g are sectioned. The screw-and-nut system is similar to that illustrated in FIGURE 6, but the screw part is constituted by the receiving member 8, as opposed to the arrangement shown in FIGURES 5 and 6. The enclosure 1 is extended at the top in order to enable the receiving member 8 to be released in its top position; the electromagnetic indexing system 50 for the said member is fitted in this extension.

What is claimed is:

1. Apparatus for obtaining controlled rectilinear movements including a rotary driving member, a driven member guided in a predetermined direction in the axis of rotation of said rotary driving member, an intermediate member forming with said driven member a screw and nut system connected solidly for rotation with said rotary driving member, means for locking said intermediate member to said rotary driving member, means for unlocking said intermediate member for free movement of said intermediate member with respect to said driving member along the axis of said driving member and resilient means for darting said intermediate member and said driven member along the axis of rotation of said rotary driving member.

2. Apparatus for obtaining controlled rectilinear movements including a rotary driving member, a driven member guided in a direction in the axis of rotation of said driving member, an intermediate member forming with said driven member a screw and nut system which is connected solidly for rotation with said driving member, means for locking said intermediate member to said driving member, means for unlocking said intermediate member for free movement with respect to said driving member in the direction of the axis of said driving member, and resilient means for darting said intermediate member and said driven member in the direction of the axis of rotation of said rotary driving member, said locking and said unlocking means comprising a plurality of arms pivotally mounted on said rotary driving member and anchoring means on said intermediate member engaged by said arms holding said intermediate member against the action of said resilient means.

3. Apparatus for obtaining controlled rectilinear movements including a rotary driving member, a driven member guided in movement in a direction determined by the axis of rotation of said driving member, an intermediate member forming with said driven member a screw and nut system which is connected solidly for rotation to said driving member, means for locking said intermediate member to said rotary driving member, means for unlocking said intermediate member for free movement with respect to said rotary driving member in the axis of rotation of said rotary driving member, a resilient system for darting said intermediate member and said driven member in the direction of the axis of rotation of said rotary driving member, said locking and unlocking means comprising arms pivotally mounted on said rotary driving member, anchoring elements on said intermediate member engaged by said arms holding said intermediate member against the action of said resilient system and electromagnetic means for controlling the rotation of said arms about their pivots.

4. Apparatus for obtaining controlled rectilinear movements including a rotary driving member, a driven member guided for movement in a direction determined by the axis of rotation of said rotary driving member, an intermediate member forming with said driven member a screw and nut system which is connected solidly for rotation to said driving member, means for locking said intermediate member to said rotary driving member, means for unlocking said intermediate member for free movement with respect to said rotary driving member in the direction of the axis of rotation of said rotary driving member, resilient means for darting said intermediate member and said driven member in the direction of the axis of rotation of said rotary driving member, said resilient means comprising a helicoidal spring between said rotary driving member and said intermediate member, said spring bearing at one end on a shoulder on said rotary driving member and bearing at its other end on a ring engaging a shoulder on said intermediate member and a second shoulder on said rotary driving member spaced from the first shoulder on said rotary driving member limiting the expansion of said spring.

5. Apparatus for obtaining controlled rectilinear movements including a rotary driving member, a driven member guided in movement in a direction determined by the axis of rotation of said rotary driving member, an intermediate member forming with said driven member a screw and nut system which is solidly connected for rotation to said rotary driving member, means for locking said intermediate member to said rotary driving member, means for unlocking said intermediate member for free movement with respect to said rotary driving member in the direction of the axis of rotation of said rotary driving member, resilient means for darting said intermediate member and said driven member in the direction of the axis of rotation of said rotary driving member and hydrodynamic braking means for said driven member and for said intermediate member acting thereon toward the end of their movement away from said rotary driving member.

6. Apparatus for obtaining controlled rectilinear movements including a rotary driving member, a driven member guided for movement in a direction determined by the axis of rotation of said rotary driving member, an intermediate member forming with said driven member a nut and screw system which is solidly connected for rotation to said rotary driving member, means for locking said intermediate member to said rotary driving member, means for unlocking said intermediate member for free movement with respect to said rotary driving member in the direction of the axis of rotation of said rotary driving member, resilient means for darting said intermediate member and said driven member in the direction of the axis of rotation of said rotary driving member, hydrodynamic braking means stopping the movement of said intermediate member and of said driven member at the end of their free movement, said hydrodynamic braking means including grooves of decreasing section decreasing in the direction of movement of said intermediate and said driven members said grooves being formed in the body of the apparatus, said intermediate member and said driven member sliding as a piston in said body and openings in said intermediate member and in said driven member for preventing hydraulic blocking of the movement of said intermediate member and said driven member.

References Cited in the file of this patent

UNITED STATES PATENTS

| | | |
|---|---|---|
| 2,780,740 | Roman et al. | Feb. 5, 1957 |
| 2,898,281 | Untermyer et al. | Aug. 4, 1959 |
| 2,937,984 | Chapellier | May 24, 1960 |

FOREIGN PATENTS

| | | |
|---|---|---|
| 944,464 | Germany | June 14, 1956 |
| 1,013,481 | Germany | Aug. 8, 1957 |
| 786,486 | Great Britain | Nov. 20, 1957 |